(12) United States Patent
Kartchner

(10) Patent No.: US 6,524,632 B2
(45) Date of Patent: Feb. 25, 2003

(54) PROCESS FOR RECOVERING FEED-GRADE PROTEIN FROM ANIMAL MANURE

(75) Inventor: Henry H. Kartchner, Tomball, TX (US)

(73) Assignee: Food Development Corporation, Houston, TX (US)

( * ) Notice: Subject to any disclaimer, the term of this patent is extended or adjusted under 35 U.S.C. 154(b) by 76 days.

(21) Appl. No.: 09/788,087

(22) Filed: Feb. 16, 2001

(65) Prior Publication Data
US 2002/0114866 A1 Aug. 22, 2002

(51) Int. Cl.⁷ .................. A23K 1/10; A23K 1/100; C05F 5/00
(52) U.S. Cl. .................. 426/55; 426/56; 426/241; 426/656; 426/807
(58) Field of Search .................. 426/55, 241, 807, 426/56, 656

(56) References Cited

U.S. PATENT DOCUMENTS

| | | | |
|---|---|---|---|
| 3,939,280 A | 2/1976 | Karnemaat | 426/2 |
| 3,997,388 A * | 12/1976 | Simon | 159/47 R |
| 4,008,689 A | 2/1977 | Albers | 119/28 |
| 4,060,054 A | 11/1977 | Blair | 119/16 |
| 4,121,539 A * | 10/1978 | Moore | 119/28 |
| 4,219,415 A | 8/1980 | Nassef et al. | 210/32 |
| 4,274,838 A | 6/1981 | Dale et al. | 48/111 |
| 4,292,328 A | 9/1981 | Coulthard et al. | 426/2 |
| 4,338,337 A * | 7/1982 | Frankl | 426/55 |
| 4,349,572 A | 9/1982 | Larson et al. | 426/335 |
| 4,354,936 A * | 10/1982 | Ishida et al | 210/602 |
| 4,429,043 A * | 1/1984 | Paton | 435/167 |
| 4,526,791 A | 7/1985 | Young | 426/53 |
| 5,472,472 A | 12/1995 | Northrop | 71/19 |
| 5,527,464 A * | 6/1996 | Bartha et al. | 210/603 |
| 5,535,528 A | 7/1996 | Finkam | 34/378 |
| 5,584,904 A | 12/1996 | Dalos | 71/9 |
| 5,637,219 A | 6/1997 | Robinson et al. | 210/603 |
| 5,811,014 A | 9/1998 | Green et al. | 210/748 |
| 5,863,434 A | 1/1999 | Masse et al. | 210/603 |
| 5,897,785 A | 4/1999 | Billings | 210/734 |
| 5,958,252 A | 9/1999 | Shades | 210/748 |
| 5,980,824 A * | 11/1999 | Kartchner | 422/22 |

FOREIGN PATENT DOCUMENTS

| | | |
|---|---|---|
| EP | 0565176 A2 | 10/1993 |
| EP | 0565176 | 10/1993 |
| GB | 1340507 A1 | 12/1973 |
| GB | 1340507 | 12/1973 |
| WO | WO 9849903 A2 | 11/1998 |
| WO | WO 9849903 | 11/1998 |

* cited by examiner

Primary Examiner—Chhaya D. Sayala
(74) Attorney, Agent, or Firm—Jenkins & Gilchrist, P.C.

(57) ABSTRACT

A process is described for recovering the protein values from animal manure, particularly cattle, pigs and poultry, for reuse as animal feed. The process involves the use of an anaerobic digester to provide methane gas for combustion and use for heating and powering the facility including a radio wave generator for sterilizing the protein and solids being recovered for the feed. Returning the water to the environment in accordance with EPA regulations.

26 Claims, 2 Drawing Sheets

PROCESS FOR RECOVERING FEED-GRADE PROTEIN FROM ANIMAL MANURE

PRIOR RELATED APPLICATION

Not applicable.

FEDERALLY SPONSORED RESEARCH STATEMENT

Not applicable.

REFERENCE TO MICROFICHE APPENDIX

Not applicable.

1. Field of the Invention

The present invention relates to a process for recovering protein suitable for an animal feed from animal manure. This process is operated to recover methane from biogas produced to supply the energy necessary for the successful economic operation of the process, which produces a protein-rich feed for livestock.

2. Description of Prior Art

The subject of how to treat manure to render it less noxious to the environment and to find suitable uses for it has long been investigated. As the population of various countries of the world have grown, so has the need for animals to supply protein to feed and nourish the growing populations. Thus, commercial operations have increased where poultry, hog, and cattle feeders and growers must enlarge their operations, but at the same time they face pressure for the removal of the animal waste produced by these animals. This manure, regardless of its animal source, can produce offensive odors and disposal problem by the shear amount that must be disposed of.

Also, as the populations increase they encroach further into agricultural areas. human residences are closer to feed lots or poultry houses. The waste-disposal problem then becomes greater since the volume of waste that cattle, hog, and poultry growers must dispose of becomes greater and the intervals between disposal get smaller. No longer can the waste merely be dumped on the land as fertilizer. To do so spreads not only the odor, but pathogens which may end up contaminating water tables supplying drinking water to the population. Drinking water contaminated by the field disposal of untreated, or even treated, animal waste can cause a myriad of diseases from its bacteria and unchecked viruses, which can produce streptococcus and staphylococcus infections, hepatitis, tetanus, tuberculosis, diphtheria and the like. Further, the pollution of streams caused by animal manure disposal can endanger the health of farm animals which graze the fields and drink from ponds or creeks which have been contaminated by water run-off from the spread of untreated animal waste.

This is not to say that the problem has not been long recognized with consequent attempts to reach a solution. For instance, U.S. Pat. No. 3,939,280 describes a method for processing poultry manure by adding an acid, particularly phosphoric acid, formaldehyde and urea to obtain a pathogen-free product suitable as an animal foodstuff for ruminant animals. An integrated system for hog production is described in U.S. Pat. No. 4,060,054 wherein the excrement is collected in a central place within the facility and treated by enzyme action and cooking, with stirring, to pasteurize the feed mixture, which is then cooled and fed back to the hog-feeding troughs as a part of the feed mixture. The is accomplished using heated waterfed from a boiler through a jacket about the cooker. A system for recovering single-cell proteins is described in U.S. Pat. No. 4,338,337, which employs a screening system for collecting the particulate waste to remove fines into the wash water used for collection of the animal waste. This process which is described in the context more of a hog barn or cattle feeding operation, employs an aerobic digestion of the fines and conversion into the single-cell proteins. The biomass such formed is recycled and used to flush the gutters of the facility to collect the nutrients into the feed material. U.S. Pat. No. 5,472,472 describes a process for biological transformation of phosphorus and nitrogen-containing animal waste into an ecologically-manageable material by making a precipitation step in a solids ecoreactor and passing the slurry into a bioreactor zone, where soluble phosphorus is precipitated with metallic salts. The mass, after passing through a polishing zone where a portion of the slurry is bioconverted to a humus, is used as a fertilizer for the soil.

An animal feed supplement, fertilizer or fuel is the result of the waste treatment process described in U.S. Pat. No. 5,535,528, where yard waste is mixed with waste animal sludge and dried to form an aggregate. The waste is treated in a thermal dryer with an inlet temperature from about 800° F. to about 1300° F. and an outlet temperature from about 200° F. to about 350° F. in order to partially dry the material and to make it virtually free of active pathogens, suggesting that all pathogens are killed in this drying step. The invention described in U.S. Pat. No. 5,811,014 relates to a method of sterilizing and sanitizing a hazardous flowable waste stream, which, while it would include human sewer waste, also describes sanitizing human blood, diseased human cells, and various hospital wastes. The process involves neutralizing the charge of the waste molecules so that they separate from each other for more efficient treatment and then exposing the liquid to ozone, electron-beam radiation and then ultraviolet radiation with more ozone through ultraviolet radiation to oxidize waste. Ultraviolet radiation and the formation of ozone through ultraviolet radiation to oxidize waste is employed in U.S. Pat. No. 5,897,785 prior to forming a semi-dry polymerized solid from the reaction product of the waste and high charge cationic polymers which is packaged for use as a fertilizer produced from animal waste.

U.S. Pat. Nos. 4,121,539, 4,354,936, 5,637,219, and 5,863,434 all describe using an anaerobic digester to produce methane from the animal waste treating process, but with varying degrees, if not discouraging degrees, of success.

The problem solved by the instant invention is the capability of processing animal manure to recover the significant protein values from the excrement which can be safely fed to animals to create weight increase. For instance, it is well-known that upon standing, the protein values of the manure, particularly poultry manure, will break down and dissipate with the passage of time. Therefore, in order to stabilize the protein present in the manure, it is important to sterilize such manure promptly to halt the bacterial degradation of the protein and to kill the incipient pathogens.

While the foregoing attempts have been made to treat solid animal waste to create a useful product widely acceptable, none have been totally successful and certainly virtually none have accomplished the conversion of protein in animal manure to high protein animal feed in the economically-sound manner of the instant invention.

SUMMARY OF THE INVENTION

The successful economic development of high-protein animal feed is accomplished by following the process described herein. In the first place, manure is collected and brought to the facility for treatment. This manure can be excrement from poultry, swine, or beef operations. It can originate at a single chicken coop or a cattle feedlot with thousands of head of cattle. Normally, in large operations the manure will end up being in the form of a slurry because of the necessity of flushing the excrement into a sump from which it can be moved to the process equipment usually based on the premises. If not ready, a slurry is formed. The use of the process of this invention can be made either at a central location where the animal waste is brought in trucks such as vacuum trucks used to "suck up" waste or unwanted materials. The treatment process can be connected integrally to the animal containment areas and receive the waste, usually in the form of a slurry.

The slurry containing the waste is held in a "day tank" for several days, preferably two to four days, to allow the oxygen to react or dissipate. Afterwards it is put in an anaerobic digester system operated at an elevated temperature of from about 35° C. to about 65° C. to cause the production of methane gas, and to some extent, carbon dioxide. The methane generation is important because the methane is captured and used to generate electricity and steam to support operation of the overall process of preparing the high-protein animal feed.

After the digestion and gas release and recovery, the slurry, having from about 45% to about 65% solids, by weight, is passed through a belt press or screw press to lower water content down to approximately 25% to 45% (65% to 75% solids). This water may be piped back to the slurry make-up step before the holding tank or to the anaerobic digester to be used as make-up water or passed on to filters before release into the environment. The solids from the filters form a compost which moves to the microwave dryer for processing and sterilizing.

The remaining solids in the form of a feed compost (after the free water is removed by the pressing process) are then conveyed to the microwave/hot air dryer for sterilization and drying down to a solids content of about 88% or over (water content from about 10% to about 12%). The microwave dryer is a vessel charged by radio frequency waves from about 915 MHz to about 2,450 MHz and is applied with outputs of 10 KW to 80 KW transmitter. The hot air for the dryer is supplied by output of hot exhaust gases from a turbine generator and/or a methane-burning heater, both utilizing methane gas generated by the anaerobic digesters.

At this point, the manure is sterilized and is substantially dry, and once sized through a series of screens, can be packaged for sale and distribution. Preferably, the course, more crunchy product would be packaged for large animal feed with the fines being packaged either for poultry or fish feed, or for use as plant fertilizer.

The methane recovered, can be processed to remove the carbon dioxide present as an anaerobic biogas co-product to enhance the heating value of the methane, even though it is not necessary to remove the carbon dioxide to create a more valuable methane. Depending upon the location of the facility and the overall amount of manure which can be treated, there may actually be excess methane produced to allow the sale of methane or electricity on the consumer market. This, of course, would depend upon the adequacy of storage facility on the location or the proximity of a pipeline or electrical lines.

The foregoing invention will be more completely described in the discussion which follows, it being manifest that there are many advantages to the practice of the invention including the upgrading of a troublesome waste to a valuable commodity and the recovery of a valuable energy resource.

DETAILED DESCRIPTION OF THE INVENTION

With the large increase in population, the necessity of feeding the population and the diminishing ground space upon which animals used for feeding the masses can grow and survive the volume of excrement (manure) resulting from expansion is increasing and the space for acceptable food growth is reduced. The sources of animal manure for the practice of this invention are many, varied and expanding. Much of the protein in animal feed is recoverable from the manure of almost any food source animal, such as cattle, hogs, and poultry, and practicing the invention may be fed back to these same animals.

Depending upon the size of the operation it may be necessary to have a storage facility where the manure could be held until there is sufficient amount to make an economically-justified process run, but the maximum protein recovery is possible when the conversion process of this invention is begun promptly before the protein has begun to decompose or the manure chip to harden.

The manure collection process is described in any number of prior art patents, for example, U.S. Pat. No. 4,121,539 describes a collection system from an animal feeding area to holding tank and treatment system to separate it from recovered methane gas. U.S. Pat. No. 5,897,785 describes scraping the manure from the animal house and to a sloping ramp which leads it to a different treatment process for treating animal manure using ultra-violet light and ozone. U.S. Pat. No. 5,472,472, which is incorporated herein for all purposes, describes a collection system wherein the manure is slurried from the point where dropped by the animal. Of course, it can be hauled into the facility by truck and dumped into a collection vessel.

Figure 1:
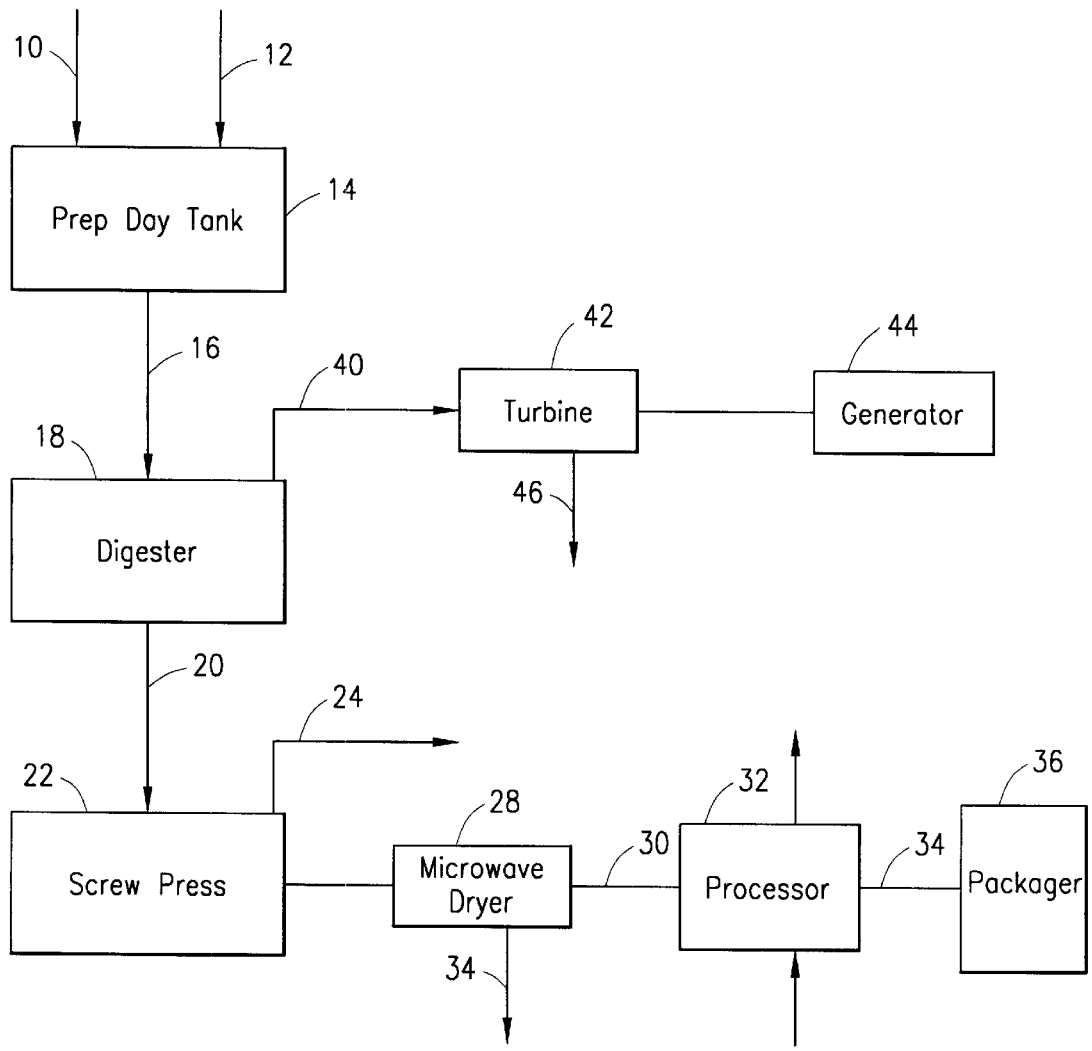
FIG. 1 shows a block flow sheet of the steps of an embodiment of the instant invention.

The present invention is shown, for instance, on FIG. 1 as a block-flow sheet. Water enters the system through line 10 or pipe 12 with the manure collected from the various sources into tank 14, where the manure; or animal waste, is put into a slurry which could either be from washing an animal feeding facility, or the excrement could be hauled in by truck and put in the tank. The water entering through line 10 could either be fresh water or water recycled from the separation of solid and liquid in the digester effluent. As stated before, U.S. Pat. No. 4,060,054 describes a system where hog production is carried out and the manure is collected and treated beneath the facility for recycle to feeding troughs. Several collection schemes are well known to those skilled in the art and would be satisfactory for the practice of this invention if designed to contain or eliminate odor. The collection and storage of the manure may occur in many ways depending upon the size and configuration of the facility.

The size and configuration would also determine how many slurry preparation tanks 14 would be necessary. In preparation tank 14 the slurry is prepared to create an aqueous manure slurry having form in about 65 to about 90 wt % water, preferably from about 80 wt % to about 90 wt % water. It can be readily seen that the size of the facility and the sources of animal manure would determine how many tanks would be desired. It is preferable that these preparation tanks 14 be equipped with some kind of continued agitation in order to allow any oxygen present in the manure be either aerobically reacted or discharged from the manure slurry. It is preferable to prepare the slurry using at least some water taken from the digestion since this water source contains active bacteria which can begin the digestion process. The preferable time for holding is in preparation tank 14 is from about 2.5 to about 4 days with about 3 days being the most preferred period.

After this holding period, the slurry passes through a conduit or conveyor 16 to an anaerobic digester 18. The digester 18 is anaerobic, preferably utilizing mesophilic anaerobic bacteria, which would promote the production of a biogas containing methane from the animal manure in the slurry charged to the digester 18. The digester 18 may be designed as described in any of the prior art patents or purchased off the shelf from recognized manufacturers. However, it is preferable that the digester 18 be either an insulated steel tank or a concrete membrane tank operating with continuous agitation in order to promote the production and efficient recovery of the biogas. This dictates that the digester 18 be an enclosed tank so that the biogas evolving can be captured for use. In a preferred mode of operation the aqueous manure slurry would be charged to the tank from a conduit 16 connected to preparation tank 14 from which the manure slurry would be discharged into the top of the digester 18. The manure slurry would remain in digester 18 for a period of from about 7 to about 30 days, preferably from about 14 days to about 20 days, depending upon the rate of digestion and quality in the digester 18 to allow for the production of the biogas containing, primarily methane and carbon dioxide.

The digester 18 is agitated by mechanical stirrers or paddles or by natural or induced turning of the slurry contents in order that the biogas be liberated from the mass and collected. As more slurry is added to the top of the digester 18, digested material would become a feed compost slurry which would be extracted from the bottom of the digester 18 through line or conveyor 20.

One of the attractive features of applying anaerobic digestion to the practice of this invention is the ability to also extract high-protein solid feed stuff from digested feed compost slurry. The 10 wt % to 20 wt % solids in the feed compost slurry can contain from 18% to 28% available protein, or an average protein content of about 25%. A considerable amount of this, however, is a protein equivalent of other undigested compounds in the solids. This protein content compares favorably with that of corn or other feed grains having about 12% protein.

The animal holding pins or houses should be constructed so that the manure is easily flushed at least once a day into the preparation tank 14 prior to charging the digester 18. This eliminates handling or transportation of the product and assures a constant supply of fresh manure with minimum labor. The modern hydraulic flush systems in place in feed facilities only dilute the solids content about 1.5% or less, keeping the amount of wash water to a minimum. The water can also be filtered and cleaned, before reuse. In preparing the manure slurry, water removed from the digester slurry can then recycled in order to take advantage of the active bacteria present. The same amount of digested product, feed compost slurry, must be removed as the raw manure slurry loaded into the digester 18. This program then produces a continuous flow of product in, and product out, allowing for a continuous daily processing volume.

An anaerobic digester 18 can be classified according to temperature, degree of mixing, loading frequency, and construction materials. Anaerobic bacteria maintain their performance for biogas production if temperatures are maintained at a temperature of from about 35° C. to about 65° C., preferably about 60° C., for a thermophilic digester. A thermophilic digester produces maximum methane yields and can be one-half to two-thirds the size of a mesophilic digester. Thermophilic indicates the process is carried out at elevated temperature, and anaerobic describes the oxygen-free atmosphere under which fermentation takes place.

Anaerobic digestion of manure is, as is well known, a three-phase process all occurring in the same vessel substantially simultaneously. The first phase consists of bacterial hydrolysis of carbohydrates, protein, and lipids, followed by fermentation of these products to fatty acids, hydrogen, and carbon dioxide. In the second phase, which occurs substantially simultaneously, a bacterial group will produce acetates, hydrogen, and carbon dioxide from the fatty acids generated in the first stage. The third stage involves methanogenic bacteria, which utilize the acetate, hydrogen, and carbon dioxide produced in the first two stages to yield methane, carbon dioxide and water.

Constant manure-loading rates, temperature, and monitoring of toxic elements, or oxygen, can be adjusted to assure that maximum production is achieved based upon operating experience. As a general rule, from a digester that is operated properly, the estimated net energy yield should be approximately 25,000 BTUs per day per 1,000 pounds of live weight for cattle, swine, and poultry. Normally, about 25% of the methane production will be used to maintain the proper temperature of the digester, but assuming that 50% of the heat can be recovered and cycled back into the fermentation system, only about 10% of the methane produced will be needed to maintain fermentation temperature. The remaining 90% of the methane can replace fossil fuels on the facility to prepare feed, heat buildings, run irrigation pumps, electric generators and fuel for trucks. The balance could be sold to utility companies in the form of gas or electricity.

The digester 18 would preferably include a mixer and a heater, which preferably would take advantage of the heat of combustion of the methane gas. Of course, in the event that the methane gas is used to operate a turbine power generator, the hot combustion exhaust gases from the turbine can also be used through direct exhaustion into the digester slurry or appropriate heat exchange tubes, which run through the digester in contact with the slurry. The slurry is kept in the digester at a temperature of from about 35° C. to about 65° C. and, preferably, at a temperature of about 600° C. The amount of time spent in the digester, with agitation, and at the elevated temperature will determine the amount of methane created.

This digestion step has been found to destroy about 80% of the pathogens present in the manure, thus preventing further decay and stabilizing the protein present for feeding to ruminant animals. The feed compost slurry thus created leaves the digester 18 through line 20, where it passes to the screw press 22. The screw press 22 is operated to reduce the water content from about 35 wt % to about 15 to about 25 wt % with the water being removed through line 24 for either disposal or recycle to the water storage 10 for reuse. Other dewatering devices may be used as recognized by those in the art; but the screw press is preferred.

The microwave apparatus 28 for sterilizing and drying of the protein feed is a vessel which allows the waste material to pass in front of an applicator wave guide for directing radio waves to and through the material. One such design of a radio frequency water treatment device particularly useful in the practice of this invention is described in U.S. Pat. No. 5,980,824, which is incorporated herein by reference for all purposes. This applicator is described as having applicability for the sterilization of animal waste, but such patent provides only the bare prophetics of its use without suggesting its incorporation into an overall integral process as described and claimed as a part of this invention. The radio frequency energy is supplied by commercially-available power oscillators with outputs in the 10 kw to 80 kw or in multiples of these higher ranges, depending on volumes of product being sterilized. The frequencies of from about 915 MHz to about 2450 MHz can be used satisfactorily for the practice of the invention. At these frequencies, water contained in the waste readily absorbs energy. Other forms of microwave treaters are equally applicable with another preferred device being the combination such as those supplied by Ferrite Corporation of Hudson, N.H. for example, microwave and baking oven through which the feed compost slurry would move along a belt when the material is dried and pathogens are killed by the microwave while contacting hot gases such as combustive gases which preferably could come from the combustion of the digester biogas or components thereof.

The dried and sterilized feed compost leaves the microwave apparatus 28 through line 30, to be ground to a uniform size in processor 32. This sized material leaves the processor 32 through conveyor 34 to package 36 after which it is packaged for transportation to the market. The packaging can be in smaller bags which can be handled by a person feeding cattle, or it may be packaged in one-ton or larger plastic containers which can be handled with a forklift and dropped into feeding equipment.

The fine, sterilized protein feed can be packaged also for sale to the fish or poultry feed market or used as fertilizer for crops. The protein animal feed recovered from the process of this invention is such that it no longer poses a problem of odor or disease, having been treated in the microwave treater. The gases produced in digester 18 leave the digester 18 through line 40 with a back pressure valve set to hold the pressure in the digester 18 at a pressure of about two inches of water. Of course other convenient back pressures may the desired depending upon the way the biogas is to be used. As an example, the gas may be burned in a turbine 42 creating combustion gasses which turns a generator 44 to produce electric power for the operation of microwave pumps, mixers and the like on the animal feeding facility or the farm upon which these animals are raised. The exhaust gases from turbine 42 would exit through line 46 where they could be used either as direct or indirect heat transfer medium for the digester 18 as well as the microwave sterilizer 28 to provide additional heat for the drying process in the microwave vessel 28.

In the practice of this invention, the methane produced in the digester is used to provide the energy for operating the rest of the system. For example, it has been determined that 3.5 pounds of water can be vaporized per kilowatt hour of electricity produced. Methane has an energy content of 1000 btu per cubic foot, and a raw biogas with a gas mixture of 60% methane and 40% carbon dioxide (with other trace gases) an energy content of about 600 btu per cubic foot of gas. As is well known, the methane can be separated from the carbon dioxide by a simple well-known amine scrubbing operation or, if in a remote location where the sale of methane is difficult due to the lack of pipeline facilities or the like, the lower heating value can be tolerated through the design of the equipment to use the methane. This combustion of methane, if occurring through a turbine, could generate electric power to operate the pumps and other apparatus required for the practice of this process. However, it must be recognized that the methane produced by this method may contain also another acid gas in the form of hydrogen sulfide and, therefore, if not treated, preferably by an amine scrubber, could produce combustion products which are highly corrosive.

Figure 2:
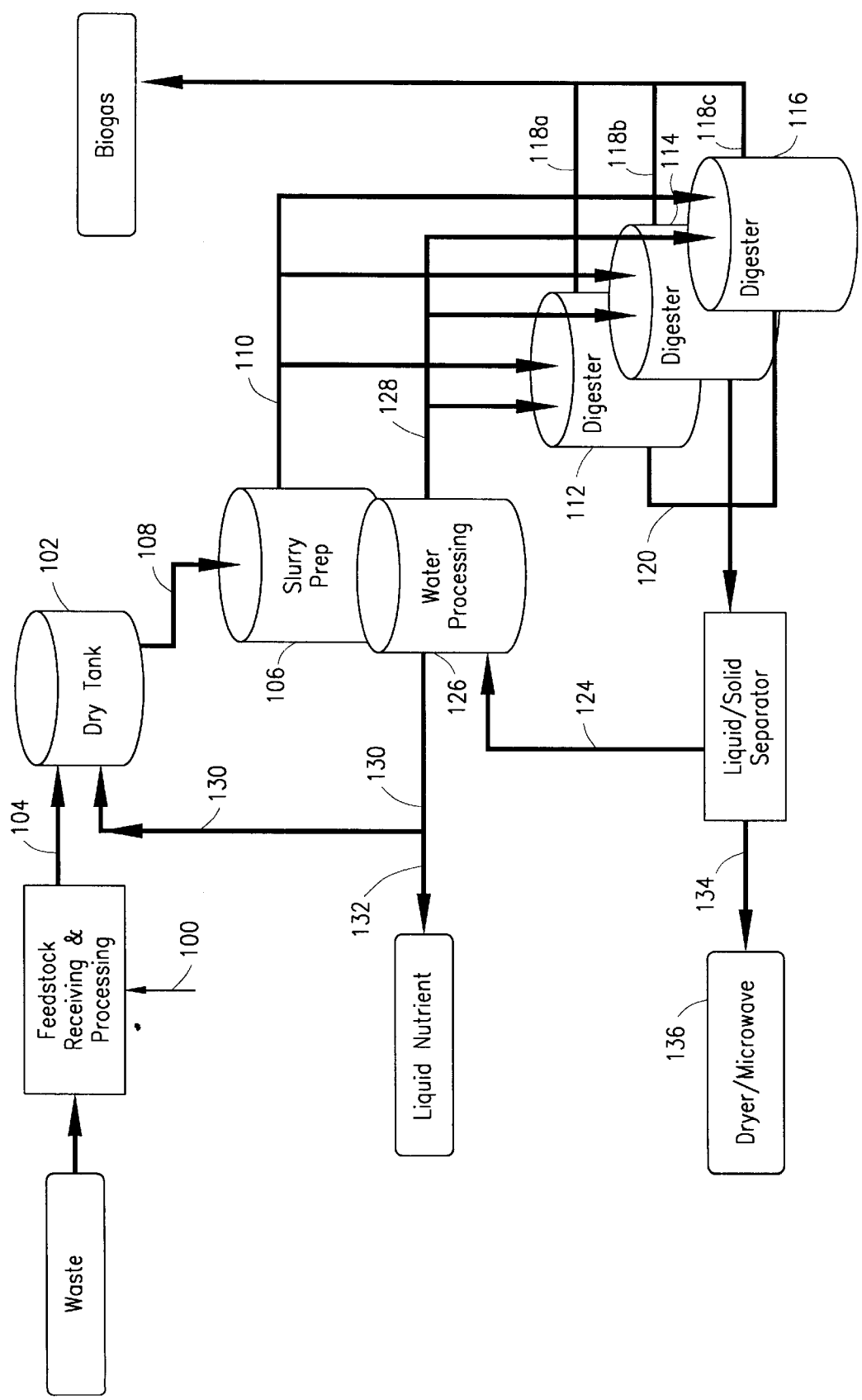
FIG. 2 shows a schematic flow sheet of a preferred embodiment of this invention.

In an especially preferred embodiment of the current invention, as shown in FIG. 2 the day tanks, slurry preparation tanks, and digester tanks would be field constructed of a size to specifically accommodate the quantity of manure which is expected to be processed. As shown in FIG. 2 the waste is delivered to a processing station 100 which can be no more than a hopper feeding day tank 102 through line 104 or a conveyor 104 whichever is appropriate. The day tanks 102, since preferably designed to hold the manure slurry for about three days prior to discharge into slurry preparation tank 106 fed by line 108 where the slurry is prepared to have about 80 wt. % water and 20 wt. % manure. The waste is initially slurried to 80% water and day tank 102 and thence to the slurry preparation tank 106 where it is held for approximately 3 or 4 days for initial digestion to aerobically take place. From there the slurry is discharged through lines 110 to digester tanks 112, 114, and 116. Also, the digesters 112, 114, and 116 would preferably be fitted with a system for causing the slurry, while anaerobically digesting the manure, to be stirred or rolled from bottom to top in order to allow the biogas thus produced to be collected and discharged through lines 118a, 118b, and 118c for further disposition as described earlier. The biogas, usually about a 60% methane and 40% carbon dioxide mixture, then can be used as combustion gas to maintain the digesters 112, 114, and 116 at operating temperature of between about 35° aqueous and 65° C., preferably about 60°. Digester tanks are 112, 114, and 116 designed to hold the manure slurry for 14 days would require several slurry preparation tanks 106. The tanks and digesters would preferably be constructed of reinforced concrete with the slurry preparation tank 106 oriented above the digester tanks 112, 114, and 116 in order to allow gravity flow from the preparation tanks to the digesters. All the tanks would be enclosed in order to prevent gas from escaping and allowing all of the gases produced by the digestion of the manure slurry to be collected. The slurry preparation tank 106, particularly, would be fitted with stirrers and agitators in or to macerate the manure into a slurried consistency.

The digesters are equipped with heating tubes, which contact the slurry directly to provide the operating temperature for the anaerobic digestion of the solids in the slurry. The digester is a closed tank operating with a back pressure of from about two inches to about four inches of water or even above. Higher back pressures accomplish no particular purpose since the pressure build-up is not great. The digesters can be a plug flow type where the manure moves horizontally from one end to the other. The gases collecting above the slurry in the digester are the biogases being primarily methane and carbon dioxide, which is used to supply power for the operation. Where there is a plentiful supply of electricity, the biogas may be directly ignited and fed through the heating tubes in the digester to maintain the temperature for the anaerobic conversions.

The other product of the digestion is a feed compost slurry containing the protein values from the manure which exits the digesters 112, 114, and 116 through lines 120 still as a compost slurry having from about 80% to 90% water as was the case when the slurry was introduced into the digesters through lines 110. As stated above the anaerobic digestion processes remove water from the system since water is a reactant in the previously described reaction. Thus water, in the form of the liquid nutrient, separated from the feed compost slurry in the liquid solid separator 122 and removed through line 124 to water processing tank 126 is returned to the digesters through lines 128 to assist in maintaining the water content of the slurry in the digester. The water which is not necessary for such purpose in the water storage tank 126 is removed through line 130 and recycled to the day tank 102 for the purposes of preparing the initial slurry and thus, the nutrient values of the water removed in the feed compost slurry from the digesters is maintained in the system. The water which is not used can in the process of the invention be removed from the system through line 132 where it can be sold as a fertilizer product.

The solid liquid separator 122 can be any type of dewatering device but the screw press is particularly preferred. There it reduces the water content of the feed compost slurry to about 35 wt % to about 50 wt % leaving through line 134 to the dryer/microwave facility 136 where it is contacted with hot combustion gases, preferably from the combustion of biogas removed from the digesters in line 118 and is also subjected to microwave transmissions at about 950 MHz or higher for about 30 minutes or until the pathogens are destroyed. The dewatered feed compost slurry is preferably passed through a microwave belt oven device 136, preferably where the feed compost is dried and sterilized. The pathogens are destroyed and the final moisture content of less than about 12 wt % water is achieved. This product then is processed by grinding and/or packaging for distribution and feeding to the animals. The water content of the feed product will be varied depending upon how it is to be sold. If the product is to be pelletized, the water content should be about 12% in order to improve structural integrity of the pellets. If sold in powder or granules form, it is well to remove more water to insure that the product flows freely.

The liquid effluent from the digester collected preferably in a concrete sump is transferred by a sump pump to water process tank 126 for recirculation to the day tank 110 to prepare more of the manure slurry for protein recovery.

From the description of the above embodiment and the invention generally, those of ordinary skill in the art can readily select the equipment to be used in the practice of this invention as well as make modifications and adjustments to the various parameters and equipment described without departing from the scope of the appended claims.

What is claimed is:

1. A process for recovering protein from animal manure for use as a sterilized animal feed which comprises the steps of:
   collecting the animal manure and forming an aqueous manure slurry therefrom;
   subjecting the manure slurry to anaerobic fermentation as an aqueous slurry at a temperature of from about 35° C. to about 65° C. for a sufficient length of time to cause a biogas to be produced from the slurry to yield a biogas stream and a feed compost slurry;
   sterilizing the feed compost slurry by exposing it to radio waves of sufficient intensity and for sufficient time to kill pathogens in the compost and render a feed compost safe for consumption by animals as a source of protein;
   drying the sterilized feed compost; and
   recovering the sterilized animal feed compost for use.

2. The process of claim 1 wherein the biogas produced is recovered for power generation to be consumed to operate the process.

3. The process of claim 2 comprising the additional steps of separating methane from the biogas and burning the methane in a gas turbine connected to a generator to produce electricity.

4. The process of claim 3 comprising the further steps of using the exhaust gas of the turbine to dry the feed compost prior to recovering the compost for feed.

5. The process of claim 1 wherein the frequency of the radio waves used in the sterilizing step is from about 915 MHz to about 2450 MHz.

6. The process of claim 1 including the step of reducing the water content of the feed compost slurry prior to the sterilizing step.

7. The process of claim 6 wherein the water content of the feed compost slurry prior to sterilization is from about 15% by weight to about 25% by weight.

8. A process for recovering protein as an animal feed from animal manure of cattle, swine, and fowl which comprises the steps of:
   collecting the animal manure and forming an aqueous manure slurry containing from about 25 wt % to about 50 wt % water;
   holding the aqueous manure slurry in a tank for a period of from about 2.5 to about 4 days until free oxygen in the slurry is consumed by aerobic reaction;
   subjecting the aqueous manure slurry to anaerobic fermentation by mesophylic anaerobic bacteria at a temperature of from about 35° C. to about 65° C. for a period of from about 14 to about 30 days to allow anaerobic digestion to occur whereby a biogas methane and carbon dioxide is evolved and a feed compost slurry is produced;
   separating the feed compost slurry from the water until the water content of the feed compost slurry is from about 15 wt % to about 25 wt %;
   exposing the feed compost slurry to radio waves having a frequency of from about 915 MHz to about 2,450 MHz for a period of time sufficient to kill all pathogens in the compost slurry and to form a sterilized feed compost safe for consumption by animals as a source of protein;
   drying the sterilized feed compost at a temperature of from about 100° C. to about 190° C. until a water content of up to about 12 wt % is produced as a raw feed compost; and
   screening the rawfeed compost to separate the feed compost by size.

9. The process of claim 8, which includes the steps of recycling the water recovered from the separation step to prepare the aqueous manure slurry.

10. The process of claim 8 wherein the methane gas is separated from the carbon dioxide in the biogas and used to provide heat for the anaerobic fermentation step and to generate electricity to provide electric power for operation of the process.

11. The process of claim 10 which includes the step of separating carbon dioxide from methane evolving from the anaerobic digestion step using an amine scrubber to separate the carbon dioxide from the methane to improve heating value of the methane.

12. The process of claim 10 wherein the methane is burned to produce steam which is used to heat the anaerobic digester and to turn a turbine to generate electricity.

13. The process of claim 8 wherein the feed compost slurry is exposed to the radio waves for about 1 minute to about 3 minutes to sterilize the compost by killing the pathogens present.

14. The sterilized animal feed produced from animal manure by the process of claim 1.

15. The sterilized animal feed produced from manure of cattle, swine or fowl by the process of claim 8.

16. A process for recovering protein from animal manure for use as a sterilized animal feed which comprises the steps of:

collecting the animal manure and forming an aqueous manure slurry therefrom;

subjecting the manure slurry to anaerobic fermentation as an aqueous slurry at a temperature of from about 35° C. to about 65° C. for a sufficient length of time to cause a biogas to be produced from the slurry to yield a biogas stream and a feed compost slurry;

sterilizing the feed compost slurry by exposing it to radio waves of sufficient intensity and for sufficient time to kill 100% of the pathogens in the compost and render a feed compost safe for consumption by animals as a source of protein;

drying the sterilized feed compost; and recovering the sterilized animal feed compost for use in a feed product.

17. The process of claim 16 comprising the additional steps of separating methane from the biogas and burning the methane in a gas turbine connected to a generator to produce electricity.

18. The process of claim 17 comprising the further steps of using the exhaust gas of the turbine to dry the feed compost prior to recovering the compost for feed.

19. A process for recovering protein as an animal feed from animal manure of cattle, swine, and fowl which comprises the steps of:

collecting the animal manure and forming an aqueous manure slurry containing from about 25 wt % to about 50 wt % water;

holding the aqueous manure slurry in a tank for a period of from about 2.5 to about 4 days until free oxygen in the slurry is consumed by aerobic reaction;

anaerobically fermenting the aqueous manure slurry in a digester using mesophylic anaerobic bacteria at a temperature of from about 35° C. to about 65° C. for a period of from about 14 to about 30 days to allow anaerobic digestion to occur whereby a biogas methane and carbon dioxide is evolved and a feed compost slurry is produced;

separating the feed compost slurry from the water until the water content of the feed compost slurry is from about 15 wt % to about 25 wt %;

exposing the feed compost slurry to radio waves having a frequency of from about 915 MHz to about 2,450 MHz for a period of time sufficient to kill all 100% of the pathogens in the compost slurry and to form a sterilized feed compost safe for consumption by animals as a source of protein;

drying the sterilized feed compost at a temperature of from about 100° C. to about 190° C. until a water content of up to about 12 wt % is produced as a raw feed compost; and screening the raw feed compost to separate the feed compost by size.

20. The process of claim 19, which includes the steps of recycling the water recovered from the separation step to prepare the aqueous manure slurry.

21. The process of claim 19 wherein the methane gas is separated from the carbon dioxide in the biogas and used to provide heat for the anaerobic fermentation step and to generate electricity to provide electric power for operation of the process.

22. The process of claim 21 which includes the step of separating carbon dioxide from methane evolving from the anaerobic digestion step using an amine scrubber to separate the carbon dioxide from the methane to improve heating value of the methane.

23. The process of claim 21 wherein the methane is burned to produce steam which is used to heat the anaerobic digester and to turn a turbine to generate electricity.

24. The process of claim 19 wherein the feed compost slurry is exposed to the radar waves for about 1 minute to about 3 minutes to sterilize the compost by killing the pathogens present.

25. The sterilized animal feed produced from animal manure by the process of claim 16.

26. The sterilized animal feed produced from manure of cattle, swine or fowl by the process of claim 19.

\* \* \* \* \*